US005366025A

United States Patent [19]

Dutschk et al.

[11] Patent Number: 5,366,025

[45] Date of Patent: Nov. 22, 1994

[54] DRILL AND/OR PERCUSSION HAMMER

[75] Inventors: Axel Dutschk, Filderstadt; Joachim Hecht, Magstadt, both of Germany

[73] Assignee: Robert Bosch GmbH, Stuttgart, Germany

[21] Appl. No.: 27,159

[22] PCT Filed: Jun. 20, 1992

[86] PCT No.: PCT/DE92/00510

§ 371 Date: Feb. 26, 1993

§ 102(e) Date: Feb. 26, 1993

[87] PCT Pub. No.: WO93/00201

PCT Pub. Date: Jan. 7, 1993

[30] Foreign Application Priority Data

Jun. 27, 1991 [DE] Germany ............................ 4121279

[51] Int. Cl.$^5$ ............................................ B23B 45/16

[52] U.S. Cl. ...................................... 173/109; 173/48; 173/204; 173/205

[58] Field of Search ..................... 173/13, 47, 48, 109, 173/204, 205

[56] References Cited

U.S. PATENT DOCUMENTS

| | | | |
|---|---|---|---|
| 4,726,430 | 2/1988 | Hendrikx et al. | 173/109 |
| 4,895,212 | 1/1990 | Wache | 173/109 X |
| 5,052,497 | 10/1991 | Houben et al. | 173/109 |

FOREIGN PATENT DOCUMENTS

| | | |
|---|---|---|
| 0145070 | 6/1985 | European Pat. Off. . |
| 0345896 | 12/1989 | European Pat. Off. . |
| 887738 | 11/1943 | France . |
| 3328886 | 2/1984 | Germany . |

*Primary Examiner*—Rinaldi I. Rada
*Attorney, Agent, or Firm*—Michael J. Striker

[57] ABSTRACT

A drill or impact hammer has a mechanical striking mechanism which is driven in a reciprocating manner by a drive element which is tiltable around an axle. A resilient driver member which is tiltable around the axle serves to transmit this movement to a striker. The driver member is articulated at the striker with play to protect the bearings from the reaction forces in percussion operation.

21 Claims, 6 Drawing Sheets

DRILL AND/OR PERCUSSION HAMMER

BACKGROUND OF THE INVENTION

The present invention relates to a drill hammer and-/or a percussion hammer.

In particular, it relates to such a hammer which has a striking mechanism with a striker accelerated by a driver member and striking a shaft of a tool, wherein the driver member is tiltable around an axis and reciprocatingly driven by a drive element rotated by a motor.

Such a device is already known from EP 0 145 070 B1. In this device the striker is driven in a reciprocating manner by a leaf spring cooperating with a supporting part. This construction is relatively costly and capable of improvement with respect to efficiency.

SUMMARY OF THE INVENTION

Accordingly, it is an object of the present invention to provide a drill and/or a percussion hammer, which avoids the disadvantages of the prior art.

In keeping with these objects and with others which will become apparent hereinafter, one feature of the present invention resides, briefly stated, in a drill and/or percussion hammer in which the driver member is driven in a reciprocating motion and is formed as a one-piece member and so as to be resilient in a springing manner and is articulated at the striker with play in an axial direction.

When the drill and/or percussion hammer is designed in accordance with the present invention, it has the advantage over the prior art that its construction makes it simple and inexpensive to manufacture, that the applied energy is converted almost completely into percussive energy, and that the bearing of the driver member is extensively protected from unwanted percussive forces. Moreover, friction occurs only in one joint in the drive of the striking mechanism.

Advantageous further developments and improvements of the drill and/or percussion hammer are possible. In a particularly advantageous manner, the striker travels in free flight for a certain distance before striking the tool or intermediate anvil so that there is no mechanical coupling between the driver member and the striker at the moment of impact. This prevents reaction forces on the driver member and its support during the impact of the striker. It is particularly simple and inexpensive to integrate an eyelet or axle directly in the driver member for the rotational articulation of the driver member. A lever which is formed so as to be integral with the driver member for transmitting the oscillating movement of the cam path to the driver member serves the same purpose. The driver member can be advantageously constructed in different ways, e.g. as a punched part, and the width of the spring material can be adapted at every location to the occurring forces. In addition, the driver member can be constructed as a bent round-wire spring. This can be easily bent to form an eyelet for the support of the driver member. Further, the driver member can be constructed as a plastic injection molded part, particularly of polyoxymethylene. This has the advantage that all cross sections of the spring can be designed in conformity to exacting requirements. A cup-shaped connecting link which can be formed so as to be integral with the driver member, which is produced particularly from plastic, or an articulated sleeve in which the lever of the driver member engages can be used for the articulation at the cam path which is constructed as an eccentric. A driver member which is constructed as a one-armed spring has the particular advantage that it can withstand torsional strain and can accordingly absorb additional forces between the striker and bearing of the driver member. A more efficient use of energy is provided when the striker which is thrown back at the tool transmits its kinetic energy to the driver member during its return stroke in that this energy is converted into spring energy. The wear on parts and bearings is considerably reduced as a result of the design of the individual structural component parts of the striking mechanism, particularly the selected magnitude of play between the driver member and striker, in that the velocities of the driver member and striker approximate one another when these members strike against one another again during the return stroke of the striker. The driver member need not be constructed as a one-piece structural component part, but can also have a sandwich type construction similar to a leaf spring, particularly also by using different suitable materials.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENT EXAMPLES

Figures 1, 2:
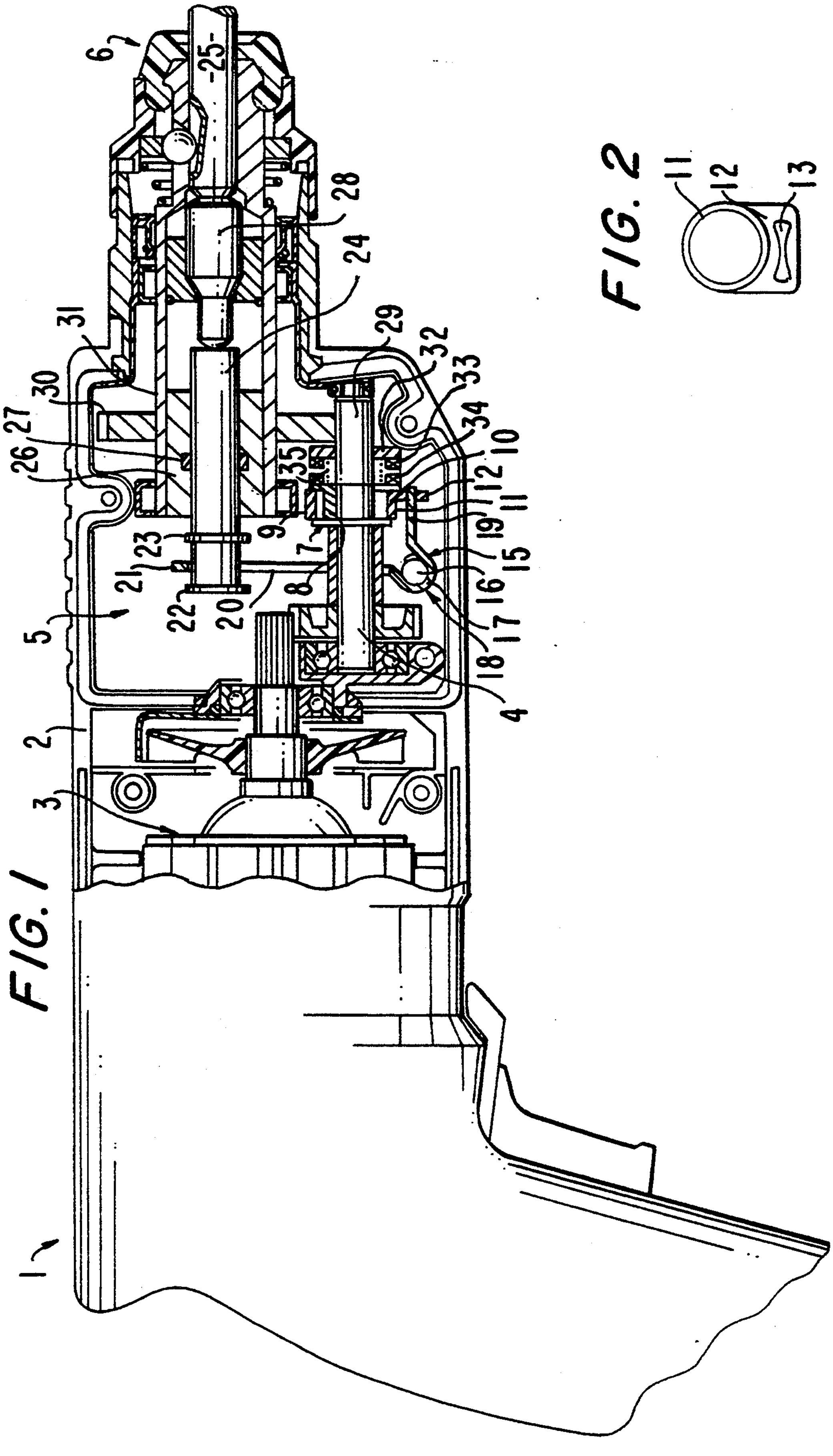
FIG. 1 shows a longitudinal section through a drill hammer.
FIG. 2 shows a detail of an articulated sleeve.

FIG. 1 shows a housing 2, a motor 3, an intermediate shaft 4, a striking mechanism 5 and a tool receptacle 6 of a drill hammer 1. The motor 3 drives the intermediate shaft 4 in rotation, a drive element 7 for the striking mechanism 5 being arranged on the intermediate shaft 4. This drive element 7 is constructed as an eccentric 8 having a sleeve which is slipped on the intermediate shaft 4. The wall thickness of the sleeve increases and decreases again continuously over the course of 360°. The outer circumference of the eccentric 8 forms an eccentric cam path 9 with reference to the intermediate shaft 4. The eccentric 8 is enclosed by a needle bearing 10 whose outer ring is formed by an articulated sleeve 11. The latter supports a downwardly directed continuation 12 having an opening 13 (see FIG. 2).

A resiliently flexible driver member 15, also designated as a spring, which is supported in the housing 2 cooperates with the drive element 7. It is tiltable around an axle 16 which is stationary with respect to the housing. An eyelet 17 is formed around the axle 16. The axle 16 and eyelet 17 form a joint 18. A lever 19 leads away from the eyelet 17 toward the articulated sleeve 11 and penetrates the opening 13. A two-legged stirrup 20 which is closed at its end 21 in a looped manner to form another lever which is articulated with play between two collars 22, 23 of a striker 24 extends preferably at an angle of approximately 90° with respect to the lever 19. The center line of the axle 16 is intersected by a straight line extending from the stirrup end 21 toward the axle 16. The center line of the lever 19 likewise intersects the center line of the axis 16 and also the center line of the stirrup end 21 at an angle of 90°. The striker 24 extends along the axial direction of a tool 25 inserted in the tool receptacle 6 and is supported in a longitudinal guide 26. An O-ring 27 is inserted into the longitudinal guide and acts on the striker so as to damp it and prevents an autonomous displacement of the striker 24. An intermediate anvil 28 is arranged between the striker 24 and the tool 25.

The driver member 15 is constructed and supported in such a way that the bearing 10 is only loaded radially in accordance with this type of construction. In particular, the recoil force of the striker 24 acting transversely relative to the driver member is absorbed and damped by the resilient driver member 15 itself.

The tool holder 6 is driven in rotation via the intermediate shaft 4 provided with teeth 29 at one end and via a toothed wheel 30 engaging in the latter. The toothed wheel is rigidly connected with a hammer tube 31 which encloses the striking mechanism 5 and is movable in an axially defined manner. A constantly rotating, axially displaceable coupling part 32 with claws 33 facing the drive element 7 also engages in the teeth 29. These claws, together with claws 34 at the eccentric 8, form a coupling, known per se, for switching on the striking mechanism. The coupling parts 8/32 are held at a distance from one another by a pressure spring 35. The coupling 8/32 closes only when the toothed wheel 30 is pressed against the coupling part 32 along with the hammer tube when the tool 25 is pressed against a workpiece, so that the drive element 7 now rotates along with the intermediate shaft 4 and the striking mechanism 5 is set in motion.

The driver member 15 is driven in reciprocating motion via the eccentric 8 when operating the drill hammer. In so doing, only the vertical deflections of the eccentric 8 with reference to the drawing plane are transmitted to the lever 19. The transverse movement of the anchor sleeve 11 is not transmitted to the lever 19 by the opening 13 which widens in this direction. This leads to a reciprocating movement of the driver member 15 around the axle 16.

The driver member 15 is located at the top dead center on the tool side at the moment that the striker 24 strikes the anvil 28 and accordingly the tool 25. The striker 24 is reflected after the hard impact and flies back to the stirrup 20 which likewise moves back. When the striking mechanism is correctly adjusted, the collar 23 contacts the driver member 17 only lightly or not at all.

After passing through its top dead center on the motor side, the driver member 15 comes into contact again with the collar 23 of the striker 24. In so doing, the stirrup 20 is bent back due to the kinetic energy of the striker 24. The residual energy from the recoil of the striker 24 is accordingly not transmitted to the bearing 10 so as to generate wear, but rather is transmitted to the resilient driver member 15 and stored therein as spring energy. In the following forward movement of the stirrup 20, the latter accelerates the striker 24 again in the direction of the tool 25 due to the forward movement of the drive element 7 and due to the springing back stirrup 20. The striker 24 generally achieves a higher velocity than the driving stirrup 20. As a result, the striker 24 disengages from the driver member 15. The striker 24 then additionally executes a free flight for a certain distance until it strikes the intermediate anvil 28 and/or the tool 25 again. The cycle now begins again.

The striker mass, the distance between the collars 22 and 23, the dimensioning and particularly the rigidity of the driver member 15 and drive element 7, as well as the drive velocity are adapted to one another in such a way that the structural component parts are stressed as little as possible by the reciprocating striker mass. The spring rigidity of the driver member 15 is neither very soft nor very hard, but rather is selected in such a way that the striker is carried along virtually without bending with a slight counter-force, but the driver member 15 yields without breaking at high differential velocities of the striker 24. In addition, the long spring travel of the driver member 15 also has a protective effect for the bearing 10 of the drive element 7.

Figure 3:
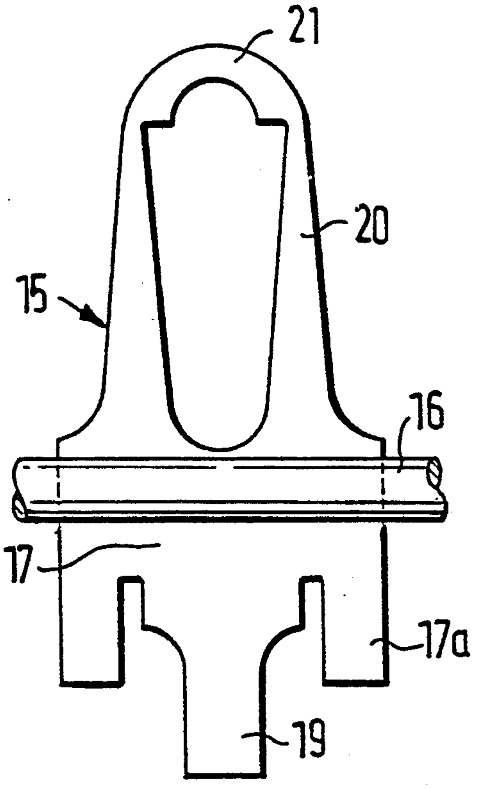
FIG. 3 shows a developed view of a driver member.
Figure 4:
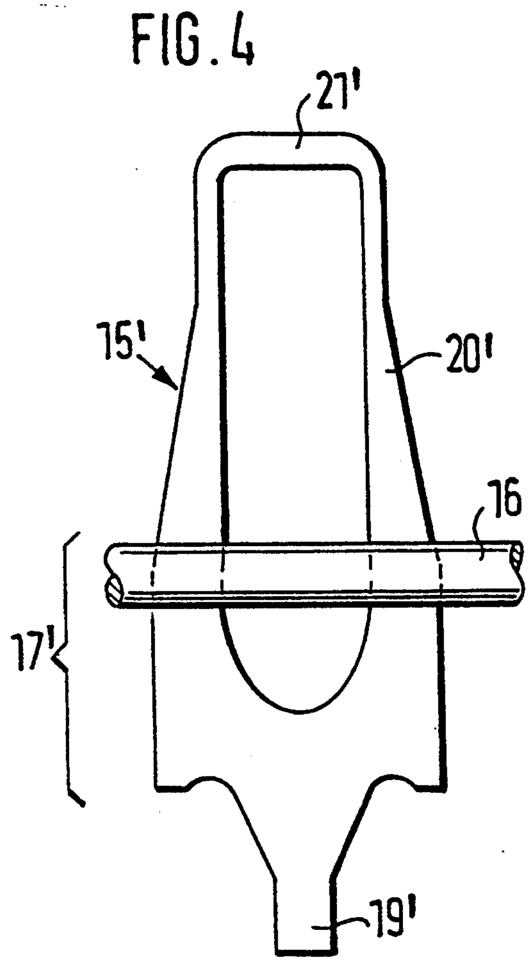
FIGS. 4, 5 and 6 show a second embodiment example of a driver member.

FIG. 3 is a developed view of a driver member 15 in detail. The central part 17 with arms **17*a* attached at the sides forms the eyelet 17 in the finished spring 15. The resilient driver member 15 is coiled in such a way that the eyelet 17 uncoils during the recoil of the striker. The entire length of the spring 15 from the end 21 of the stirrup to the end of the lever 19 inserted in the articulated sleeve 11** is available for spring travel.

The second embodiment example of a driver member 15' according to FIGS. 4 to 7 substantially corresponds to the first embodiment example with the exception of the coiling direction of the eyelet 17' and the punched shape. The stirrup end 21' is constructed with more of an edge. The width of the legs of the stirrup 20' steadily increases from the end of the stirrup to the end of the eyelet 17'. All recesses are rounded off in the region of the eyelet 17' where the greatest stresses occur. The lever 19' also increases in width toward the eyelet 17'. The material strength or thickness of the driver member 15' is constant so that it can be produced by punching.

Figure 5:
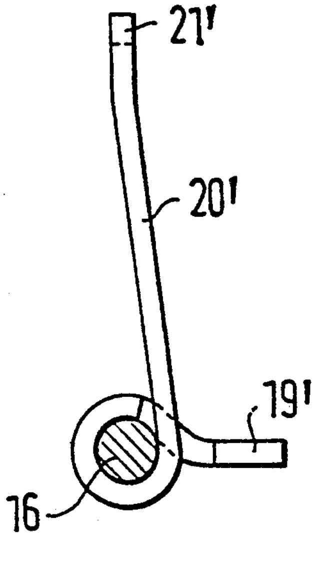

The coiling direction is shown in FIG. 5. The eyelet 17' is coiled in such a way that it forms a single complete loop around the axle 16, and the stirrup 20' and lever 19' cross once at the beginning or at the end of the eyelet 17'. Thus, in contrast to the first embodiment example, a spring distance which is lengthened by a quarter turn around the axle 16 is utilized for absorbing energy and damping when the striker 24 recoils.

Figure 6:
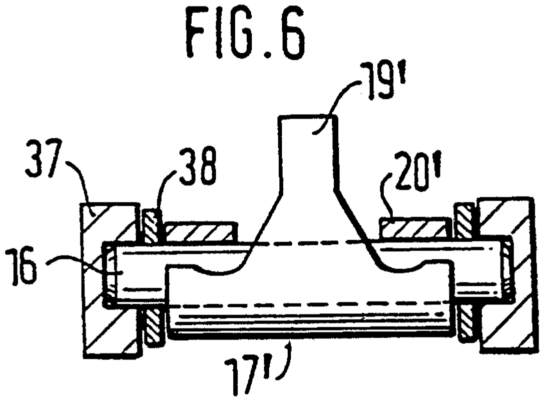
Figure 7:
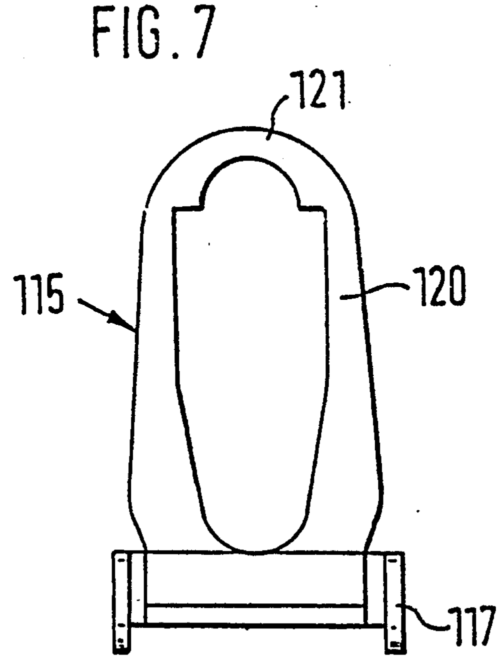
FIGS. 7 and 8 show a third embodiment example of a driver member.
Figure 8:
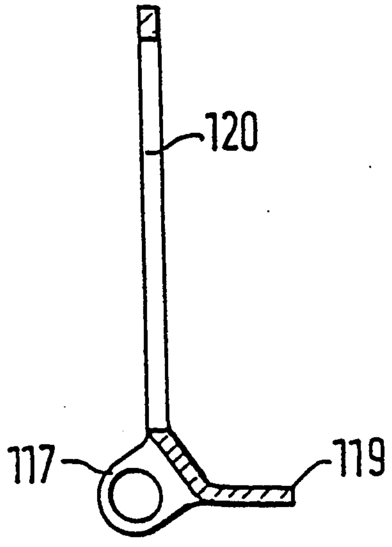

The support of the driver member 15' is shown in FIG. 6. The eyelet 17' is coiled around the axle 16 which is supported in bearing bushes 37 which are preferably arranged in the housing 2. Washers 38 are inserted between the driver member 15' and the bearing bushes 37. The stirrup 20' is only partially shown for better clarity. The axle 16 and its support are identical to the construction in the first embodiment example.

The driver member 15' of the second embodiment example has a particularly long spring travel. Stress peaks are prevented by this construction, as are fluctuations in rigidity. The optimized diffusion of stress leads to a reduced risk of breakage of the spring 15′. The tendency of the eyelet 17′ to become smaller when the driver member 15′ is tensioned is countered by correspondingly selected play between the eyelet 17′ and axle 16.

The driver member 115 according to the third embodiment example is a punched and bent structural component part. A lever 119 is bent down from the stirrup 120. In the region of this bend, two brackets are bent down with the eyelets 117 in a plane at a right angle to the stirrup 120 and the lever 119. The stirrup end 121 is adapted to the cross section of the striker 24. The driver member 115 is easily exchangeable with the driver member 15 from FIG. 1. The position of the axle 16 can be adapted if necessary to the position of the eyelets 117 relative to the stirrup 120 and the lever 119.

Figure 9:
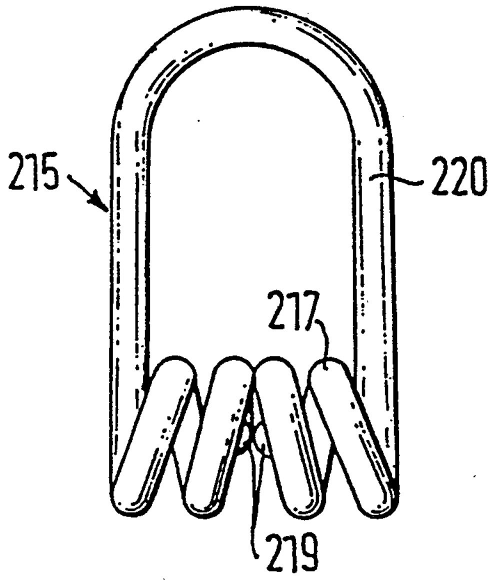
FIGS. 9 and 10 shows a fourth embodiment example of a driver member.
Figure 10:
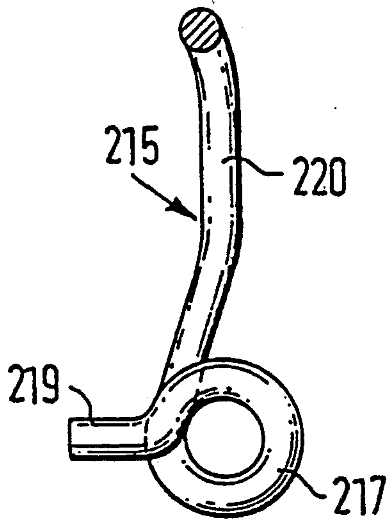

In the fourth embodiment example according to FIGS. 9 and 10, the driver member 215 is produced from a bent roundwire spring. A stirrup 220 is formed by the central part of the wire spring and subsequently passes into an eyelet 217 at both sides. A lever 219 which is formed by the ends of the wire is bent away from the eyelet 217. The eyelet of the driver member 215 can be coiled in the loosening or tightening coiling direction corresponding to the first two embodiment examples.

Figure 11:
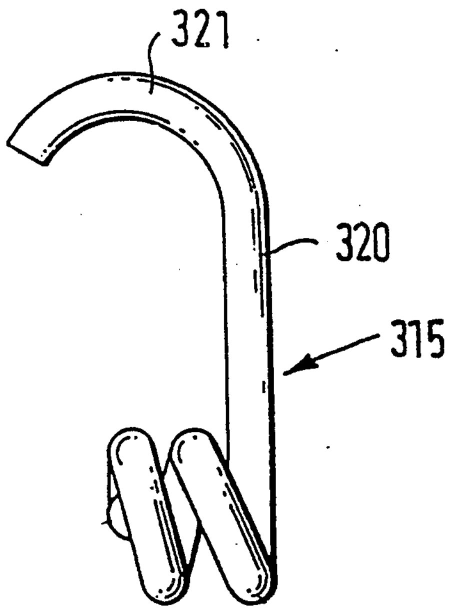
FIGS. 11 and 12 show a fifth embodiment example of a driver member.
Figure 12:
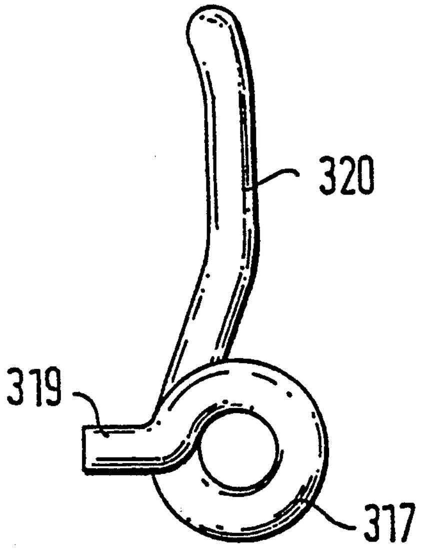

The fifth embodiment example according to FIGS. 11 and 12 shows a driver member 315 with a one-armed stirrup 320. This construction of a driver member is suitable particularly for lighter machines and corresponds to the previous embodiment example with the exception that the stirrup end 321 is severed at one side. The one-armed stirrup can be subjected to torsion as well as bending.

Figure 13:
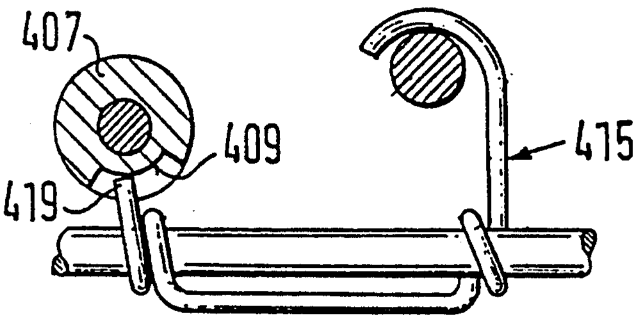
FIG. 13 shows a sixth embodiment example.
Figure 14:
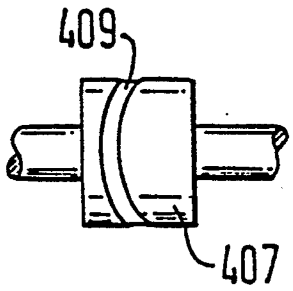
FIG. 14 shows a cam path belonging to the latter.

In the sixth embodiment example according to FIGS. 13 and 14, the driver member 415 is likewise constructed as a wire stirrup spring. A lever 419 cooperates with a cam path 409 of a drive element 407. The cam path 409 is constructed as a bent groove in the cylindrical drive element 407.

Figure 16:
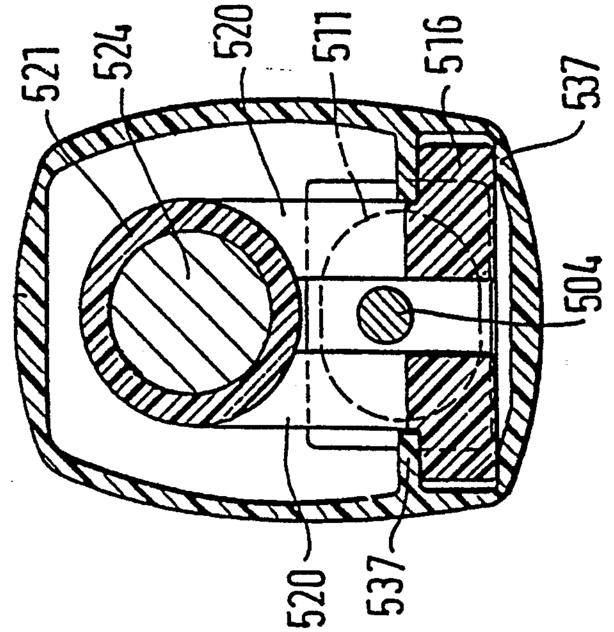
FIGS. 15 and 16 show a seventh embodiment example in longitudinal and transverse section.
Figure 15:
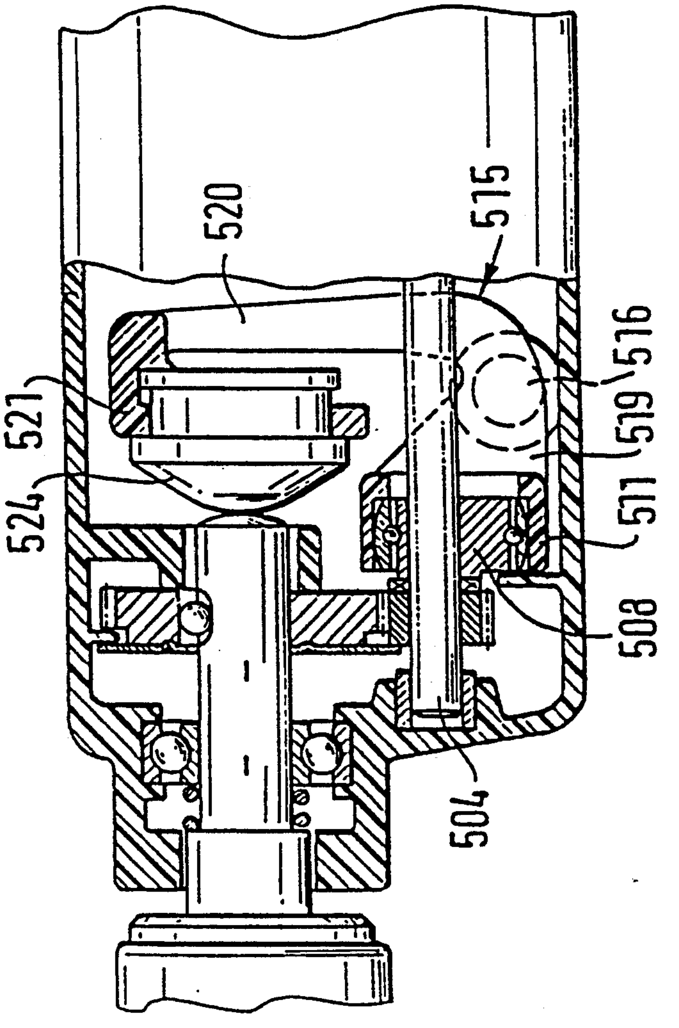

In the seventh embodiment example according to FIGS. 15 and 16, a resilient driver member 515 is constructed as a plastic injection molded part. In particular, polyoxymethylene is a possible work material. An eyelet 521 is formed on at a stirrup 520, a striker 524 being received in the latter so as to be axially movable. Two axle ends 516 are formed on at the end of the stirrup 520 opposite the eyelet 521. These axle ends 516 are inserted into bearing bushes 537 in the housing 502. A lever 519 extends away from the axle ends 516, a connecting link 511 in the form of an approximately oval cup being arranged at the end of the lever 519. The connecting link 511 engages around an eccentric 508 and corresponds with respect to its horizontal inner dimensions to the diameter of the eccentric 508. Its vertical inner dimensions are at least equal to the diameter of the eccentric 508 with respect to its eccentricity so that the movements executed by the eccentric 508 transversely to the axle 516 are not transmitted to the driver member 515 (see FIG. 16). The eccentric 508 sits on an intermediate shaft 504 as a drive element. The outer surface of the eccentric 508 is curved to prevent a clamping of the rigid connecting link 511 during operation.

The seventh embodiment example corresponds exactly to the other embodiment examples with respect to function. The striker 524 which is supported so as to be axially movable relative to the eyelet 521 of the driver member 515 can also travel a certain distance in free flight prior to striking the anvil or tool spindle 528. The driver member 515 includes the eyelet 521, the axle ends 516, the lever 519, and the connecting link 511 simultaneously in a one-piece construction. The entire driver member acts as a spring and simultaneously damps recoil blows of the striker 524.

Figure 17:
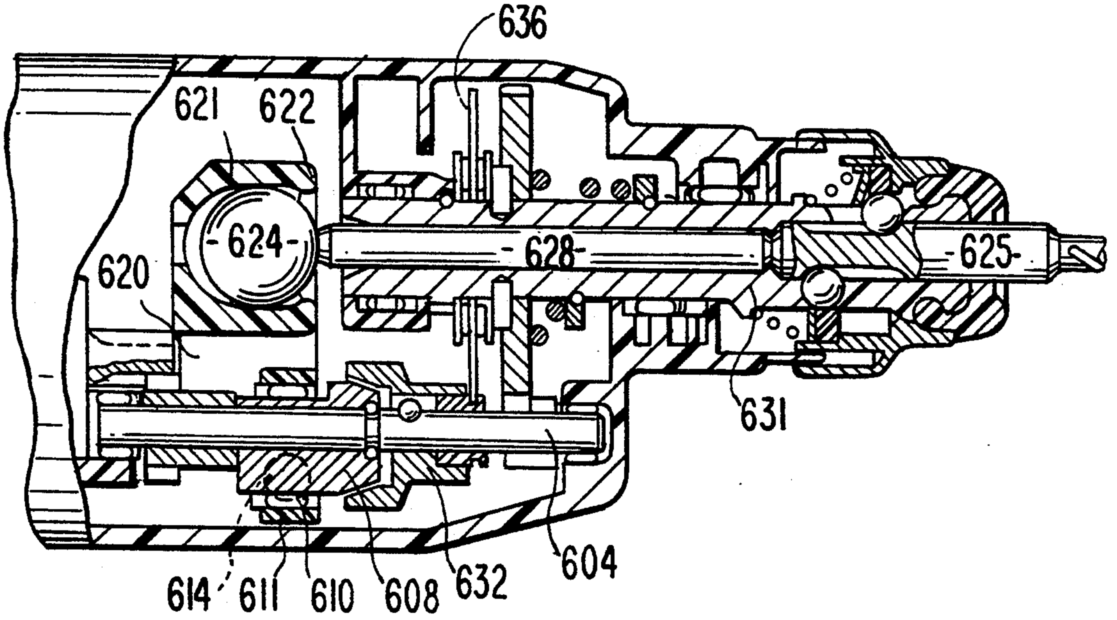
FIGS. 17 and 18 show an eighth embodiment example.
Figure 18:
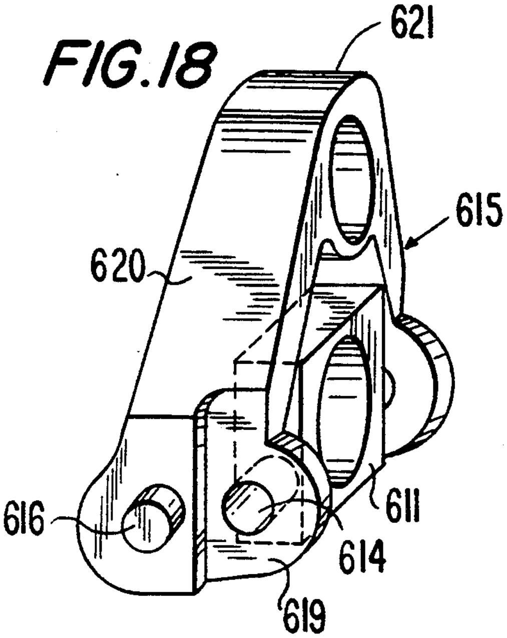

In the eighth embodiment example according to FIGS. 17 and 18, the driver member 615 is likewise manufactured from plastic. As in the preceding embodiment examples, the reference numbers of structural component parts with identical function increase by multiples of a hundred relative to the reference numbers of the first embodiment example. An eccentric 608 surrounded by a needle bearing 610 and a connecting link 611 sits on an intermediate shaft 604 which is driven in rotation. The connecting link 611 is rotatably supported by means of two journals 614 in the driver member 615. It can be produced from plastic, metal or light alloy.

The entire driver member 615 is shown in FIG. 18 as an individual part. It has two axle ends 616 in the vicinity of the connecting link 61 and is swivelable by the eccentric 608 around these axle ends 616. The portion between the axle ends 616 and the journals 614 embodies a lever 619 corresponding to the preceding embodiment examples. The portion between the axle ends 616 and a capsule 621 at the end of the driver member 615 forms a resilient stirrup 620. The capsule 621 which is formed at the driver member 620 so as to be integral with it has a hollow space defined by an inwardly projecting collar 622, a spherical striker 624 being held in this hollow space with play transversely to the stirrup 620. The striker cooperates with an intermediate anvil 628 which is guided in a longitudinal guide coaxially relative to a tool 625.

The eccentric 608 is connected with the intermediate shaft 604 via a conical coupling part 632. The coupling part 632 is axially displaceable on the intermediate shaft 604 via a disk or lever 636 supported in the manner of a ball joint relative to the hammer tube 631. The coupling part 632 first contacts the eccentric in a positive- or force-locking manner when the hammer tube is displaced by means of the tool 625 toward the inside, i.e. to the left as seen in FIG. 17.

The play between the striker 624 and the hollow space in the capsule 621 enables the striker 624 to travel in free flight for a certain distance in the axial direction of the intermediate anvil 628. For the rest, this embodiment example functions according to the preceding examples.

The invention is not restricted to the embodiment examples shown in the drawings. In particular, the different variants of the driver member are interchangeable. Thus, the eyelet in the first embodiment example can also be formed by an additional winding of the driver member 15 around the axle 16, resulting in a lengthened spring travel. In so doing, there is a narrowing in width toward the lever 19 until the end on the lever side is looped through the intermediate space between the legs of the stirrup 20 as in the third embodiment example.

The driver member can also be constructed as a leaf spring—similar to rear axle springs in trucks—with a plurality of layers of material lying one on top of the other. Different materials such as spring steel, plastic, or hard rubber can also be combined. Instead of an eccentric, other structural component parts with suitable cam paths can also be used as a drive element.

It will be understood that each of the elements described above, or two or more together, may also find a useful application in other types of constructions differing from the types described above.

While the invention has been illustrated and described as embodied in a drill hammer and/or percussion hammer, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A hammer, comprising a motor; a striking mechanism including a striker having an axis and a driver member connected with said striker and accelerating said striker so that said striker can periodically strike a shaft of a tool, said driver member being driven in a reciprocating manner from said motor, said driver member which is driven in a reciprocating manner being formed as a one-piece member which is resilient in a springing manner, said driver member forming an angular lever member which is tiltable around an axis of tilting and being articulated on said striker with play in an axial direction and in a radial direction of said striker, so that said striker is freely axially displaceable relative to said driver member for a certain distance.

2. A hammer as defined in claim 1; and further comprising a drive element provided with a cam path, said drive element being rotated by said motor and reciprocatingly driving said driver member.

3. A hammer as defined in claim 2, wherein said cam path of said drive element is an eccentric.

4. A hammer as defined in claim 1; and further comprising an axle which defines said axis of tilting of said driver member; an eyelet provided on said driver member and forming a joint with said axle; and a lever which cooperates with said cam path and is arranged at said driver member remote from said joint and integral with said joint.

5. A hammer as defined in claim 2, wherein said driver member has a cup-shaped connecting link engaging around an eccentric for coupling at said cam path.

6. A hammer as defined in claim 2; and further comprising an articulated sleeve arranged between said driver member and said cam path.

7. A hammer as defined in claim 1; and further comprising an intermediate anvil located between said striker and the shaft of a tool, said driver member being arranged so that said striker travels in free flight for a certain distance before striking said intermediate anvil.

8. A hammer as defined in claim 1; and further comprising an axle which defines said axis of tilting of said driver member, said driver member being provided with an eyelet which forms a joint with said axle.

9. A hammer as defined in claim 2; and further comprising an axle which defines said axis of tilting of said driver member, said driver member being formed with said axle.

10. A hammer as defined in claim 1, wherein said driver member is formed as a resilient punched part.

11. A hammer as defined in claim 1, wherein said driver member is formed as a bent round-wire spring.

12. A hammer as defined in claim 1, wherein said driver member is coiled into a loop to form an eyelet; and further comprising an axle which defines said axis of tilting of said driver member and forms a joint with said eyelet.

13. A hammer as defined in claim 1, wherein said driver member is formed as an injection molded part of plastic.

14. A hammer as defined in claim 13, wherein said driver member is composed of polyoxymethylene.

15. A hammer as defined in claim 1, wherein said driver member is constructed as a one-armed spring which can be subjected to torsional strain.

16. A hammer as defined in claim 1, wherein said driver member is formed so that said striker is cushioned by said driver member when recoiling, by transforming a kinetic energy of said striker into spring energy.

17. A hammer as defined in claim 1, wherein said driver member is formed so that the play between said driver member and striker is dimensioned in such a way that velocities of said driver member and said striker approximate one another when said driver member and said striker impact during a recoil of said striker.

18. A hammer as defined in claim 1, wherein said driver member is formed as a sandwich-type member.

19. A hammer as defined in claim 18, wherein said sandwich-type member has parts composed of different materials.

20. A hammer as defined in claim 18, wherein said sandwich-type member is a leaf-spring shaped member.

21. A hammer as defined in claim 1, wherein said driver member is formed as a spring which has one lever articulated at said drive element and another lever articulated at said striker.

* * * * *